United States Patent [19]
Madduri

[11] Patent Number: 5,664,176
[45] Date of Patent: *Sep. 2, 1997

[54] MOVING WRITE LOCK FOR REPLICATED OBJECTS

[75] Inventor: Hari Haranath Madduri, Austin, Tex.

[73] Assignee: International Business Machines Corporation, Armonk, N.Y.

[ * ] Notice: The term of this patent shall not extend beyond the expiration date of Pat. No. 5,418,966.

[21] Appl. No.: 381,623

[22] Filed: Jan. 31, 1995

Related U.S. Application Data

[62] Division of Ser. No. 961,757, Oct. 16, 1992, Pat. No. 5,418,966.

[51] Int. Cl.$^6$ .................................................. G06F 17/30
[52] U.S. Cl. ........................ 395/608; 395/617; 395/772
[58] Field of Search ............................. 395/200.03, 453, 395/468, 485, 490, 600

[56] References Cited

U.S. PATENT DOCUMENTS

| | | | |
|---|---|---|---|
| 4,506,360 | 3/1985 | Kryskow, Jr. et al. | 370/85.4 |
| 4,562,539 | 12/1985 | Vince | 395/200.08 |
| 4,805,106 | 2/1989 | Pfeifer | 395/650 |
| 4,961,134 | 10/1990 | Crus et al. | 395/600 |
| 4,965,715 | 10/1990 | Yoshida | 395/375 |
| 5,055,999 | 10/1991 | Frank et al. | 395/490 |
| 5,220,657 | 6/1993 | Bly et al. | 395/479 |
| 5,226,143 | 7/1993 | Baird et al. | 395/472 |
| 5,274,789 | 12/1993 | Costa et al. | 395/416 |
| 5,418,966 | 5/1995 | Madduri | 395/725 |

*Primary Examiner*—John C. Loomis
*Attorney, Agent, or Firm*—Jeffrey S. LaBaw

[57] ABSTRACT

Efficient update and presentation of a plurality of replicated data objects is accomplished with a write lock which moves among the replicas of a data object. After any necessary preparation for updating a data object, a shadow replica requests a write lock from the replica which currently holds the write lock or from the replica designated as the master replica. The write lock is moved to requesting shadow replica which performs an update to itself. The update is then reflected at the local system display to provide visual feedback to the user. The update is propagated to the other replicas which present the change at their associated displays. In the preferred embodiment, the write lock is retained at the replica which last requested the write lock as it is the most likely to receive the next update. While the invention finds particular application in a distributed data processing environment, it can also be used in a single processor having multiple replicas in separate memory partitions.

11 Claims, 8 Drawing Sheets

MOVING WRITE LOCK FOR REPLICATED OBJECTS

This application now is a divisional application of application Ser. No. 07/961,757, filed Oct. 16, 1992, now U.S. Pat. No. 5,418,966.

BACKGROUND OF THE INVENTION

This invention relates generally to replicated data. More particularly, it relates to moving a write lock between a plurality of in memory replicated data objects.

It is becoming increasingly prevalent to couple plurality of data processing systems in a distributed environment via a network. In the distributed applications which are built on a peer-to-peer relationship the systems cooperate to perform a given function. This cooperation may entail sharing multiple copies of data objects for good interative performance. As the cooperation via one or more shared disk files can be unacceptably slow from any application to ensure better response times the data object are replicated in multiple address spaces. In the distributed systems in a network, a replica of the data object will be found in the memories of several of the data processing systems. A method of managing data across all the replicas must be performed to ensure that the data at each system is current and complete. One of the techniques in the prior art is to use a primary or master copy where the master copy is updated first and all other copies are synchronized to it. In interactive applications, it becomes impractical to delay the feedback to the user at a local display until all copies are updated, particularly in a distributed system.

A replicated data object is a logical unit of data which is physically replicated in multiple memories. Each memory is generally the main memory of an individual data system coupled to a network. The replicated data object despite being in several physical locations may behave like a single copy of the data object. One implication of behaving as a single copy is that if any replica is updated, all other replicas are also updated. By reading any one local replica, a given processor will know the data in the identical replica at a distant location. If the replicas are a coupled in an object oriented program, the system can have a plurality of replicas which not only contain identical data, but also are logically equivalent.

The invention suggests an improved means to update a replicated data object in multiple address spaces.

SUMMARY OF THE INVENTION

It is therefore an object of the invention to improve the speed of updating a replicated data object in multiple-address spaces.

It is another object of this invention to speed the presentation of changes to the replicated data object at the data processing system at which the changes are originally introduced.

These objects and others are accomplished by a write lock which moves among the replicas of a data object. The invention is used in a data processing system having at least one processor and memory, but is preferably used in a distributed data processing system, in which a plurality of replicas of a common data object reside in multiple address spaces. After any necessary preparation for updating a data object, a shadow replica requests a write lock from the replica which currently holds the write lock or from the replica designated as the master replica. The write lock is moved to the requesting shadow replica which performs an update to itself. The update is then reflected at the local system display to provide visual feedback to the user. The update is propagated to the other replicas which present the change at their associated displays.

In the preferred embodiment, the write lock is retained at the replica which last requested the write lock as it is the most likely to receive the next update. In some embodiments of the invention, after the write lock is requested from the master replica, the master replica determines whether it has the write lock. If not, the master requests the return of the write lock from a shadow replica which is holding the write lock. The shadow replica holding the write lock returns the write lock to the master as well as any new updates which were currently in process. The master replicas propagates the second update to the plurality of replicas in the various address spaces and gives the write lock to the latest replica to request it. In other embodiments, the master replica keeps track of the location of the write lock. The shadow which wants the write lock queries the master replica as to which of the plurality of replicas currently holds the write lock and asks the holding replica itself.

While the invention finds particular application in a distributed data processing environment, it can also be used in a single processor having multiple replicas in separate memory partitions.

BRIEF DESCRIPTION OF THE DRAWINGS

These and other features and objects of the present invention will be more readily understood with reference to the attached drawings and following description.

DETAILED DESCRIPTION OF THE DRAWINGS

The invention may be run on a variety of computers or collection of computers under a number of different operating systems. The computer could be for example, the personal computer, a mini computer or mainframe computer. Preferably, however, a plurality of computers which are part of a network such as a Local Area Network or Wide Area Network or larger teleprocessing system are used. Although the specific choice of computer is limited only by disk and disk storage requirements, computers in the IBM PS/2 lot series of computers could be architected according to the present invention. For additional information on IBM's PS/2 series of computers, the reader is referred to *Technical Reference Manual* Personal Systems/2 Model 50, 60 Systems IBM Corporation, Part No. 68X2224 Order Number S68X-2224 and *Technical Reference Manual Personal Systems/2 (Model 80) IBM Corporation* Part No. 68X2256 Order Number S68X-2254. One operating system which an IBM PS/2 personal computer may run is IBM's OS/2 2.0 for more information on the IBM OS/2 2.0 Operating System the reader is referred to *OS/2 Technical Library, Programming Guide Vo. 1, 2, 3 Version* 2.00, Order nos. 10G6261, 10G6495, 10G6494.

In the alternative, the computer systems might be in the IBM RISC System/6000 (TM) line of computers which run on the AIX (TM) operating system. The various models of the RISC System/6000 is described in many publications of the IBM Corporation, for example, *RISC System/6000*, 7073 and 7016 *POWERstation and POWERserver Hardware Technical* Reference. Order No. SA23-2644-00.

The AIX operating system is described in *General Concepts and Procedure—AIX Version 3 for RISC System/6000* Order No. SC23-2202-00 as well as other publications of the IBM Corporation.

Figure 1:
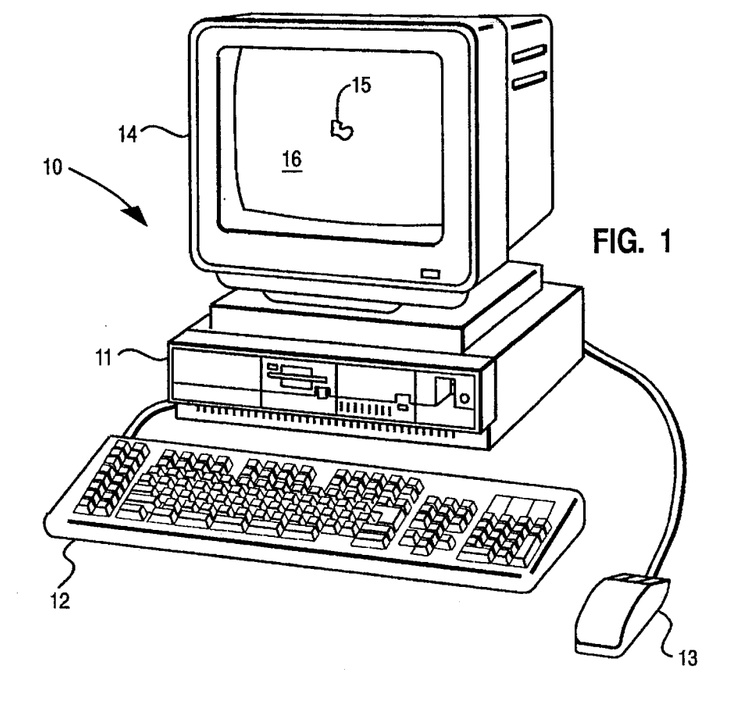
FIG. 1 shows a computer comprising system unit, keyboard, mouse and display.

In FIG. 1, a computer 107 comprising a system unit 11, a keyboard 12, a mouse 13 and a display 14 are depicted. The screen 16 of display device 14 is used to present the visual changes to the data object. The graphical user interface supported by the operating system allows the user to use a "point and shoot" method of input by moving the pointer 15 to an icon representing a data object at a particular location on the screen 16 and press one of the mouse buttons to perform a user command selection. The data object selected will appear on a window which may present any number of selected views of the object.

Figure 2:
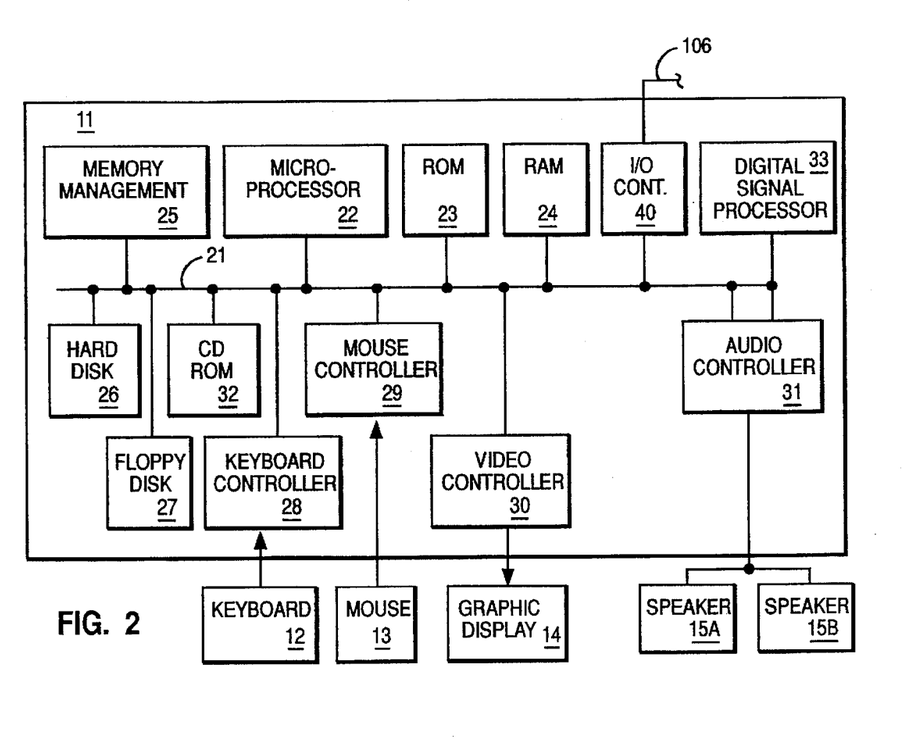
FIG. 2 is a block diagram of the components of the personal computer shown in FIG. 1.

FIG. 2 shows a block diagram of the components of the multimedia personal computer shown in FIG. 1. The system unit 11 includes a system bus or buses 21 to which various components are coupled and by which communication between the various components is accomplished. A microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors, however, other microprocessors included, but not limited to Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input/Output System (BIOS) which controls basic hardware operations such as the interaction and the disk drives and the keyboard. The RAM 24 is the main memory into which the operating system and multimedia application programs are loaded. The memory management chip 25 is connected to the system bus 21 and controls direct memory access operations including, passing data between the RAM 24 and hard disk drive 26 and floppy disk drive 27. A CD ROM 32 also coupled to the system bus 21 is used to store the large amount of data present in a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably in incorporated into the audio controller 31. The speakers 15a and 15b may be used to present audio objects to the user. Lastly, also coupled to the system bus is an I/O controller 40 such as a Token Ring adapter and which couples the system to the local area network 106.

Figure 3:
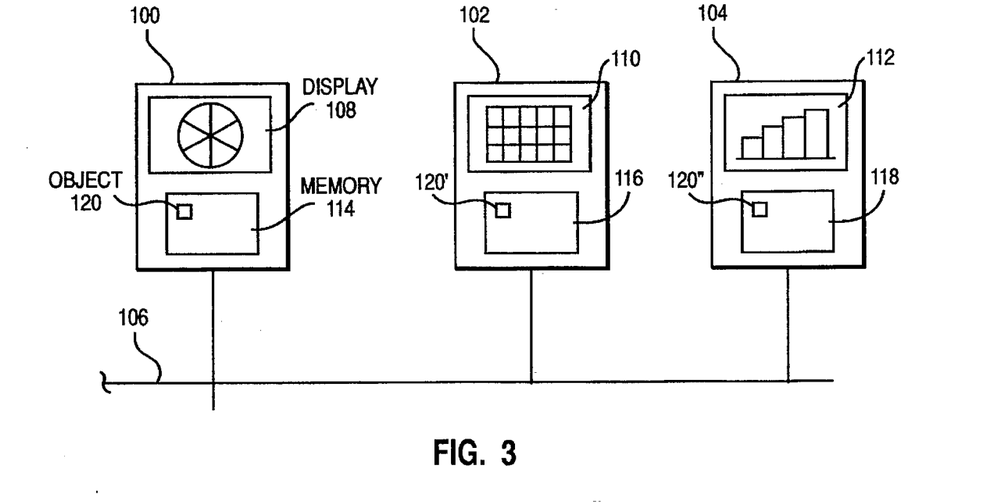
FIG. 3 is a generalized network architecture in which the present invention is implemented.

FIG. 3 is a depiction of a distributed cooperative environment in which the invention is used. Three data processing systems 100, 102 and 104 are shown coupled to a network 106. These systems could be the data processing systems from any number of vendors, but preferably, they are the products of the IBM Corporation. The network 106 could be an Ethernet or PCNet. Preferably, it is the IBM Token Ring. In this simplified drawing, each system is shown having a display and a memory and share a replicated data object. For the first system 100, the display 108 shows a pie chart view of the data object 120 which is in memory 114. In the second system 102, the display 110 shows a table view of the data object 120 resident in memory 116. In the third system 104, the display 112 shows a bar chart view of the data object 120 resident in memory 118. For purposes of discussion below, the data object in the first computer system 100 is the master replica and those in the second and third systems 102, 104 are the first and second shadow replicas respectively. While the illustrated embodiment shows invention working on three separate processors coupled to the network, any number of processors may be coupled to the network. An alternative embodiment of the invention would have three separate processes working on a single processor in three different memory partitions connected by an interprocess communication facility.

Figure 4:
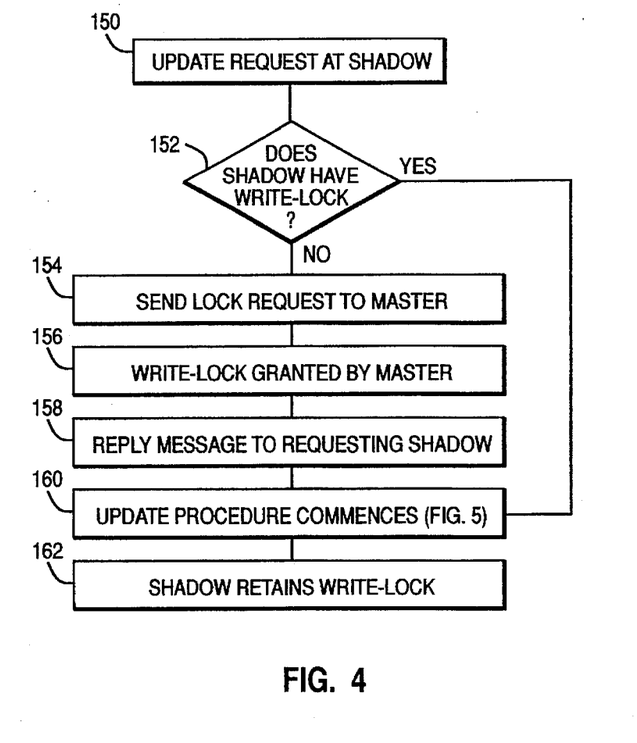
FIG. 4 is a flow diagram of one embodiment of a request for the write lock originating at a shadow replica according to the present invention.

FIG. 4 is a flow diagram of an embodiment for request for the write lock originating at a shadow replica to perform an update. For example, the first 120' shadow on the second system 102 (FIG. 3) may wish to perform an update. Any modification to the state of the object would be an update. The state can be changed by addition/deletion/modification of data. For example, for a text object, (which would be used by a group editor of documents), the addition of a word, the deletion of a word or the modification of a word would be updates. The process begins with the request to update the shadow replica in step 150. The test is performed to determine whether the shadow has the write lock .already in step 152. If so, the update procedure commences. If not, the shadow replica sends a request for the write lock to the master replica. In the flow diagram of FIG. 4, the write lock is assumed to be initially held by the master replica. Thus, in step 156, the write lock is granted by the master to the first shadow replica. In step 158, the first shadow receives a message informing it that the first shadow now has the write lock. The update procedure depicted in FIG. 5 commences, step 160. After the conclusion of the update procedure, the requesting shadow, in this case, the first shadow, retains the write lock, step 162. In the preferred embodiment, the last shadow to request the write lock or to perform an update retains the write lock to improve system performance. It is generally true that updates are performed to a data object in groups of updates, rather than in a single isolated update. Therefore, rather than returning the write lock to the master and having to request it a second time, system performance is improved by retaining the write lock at the last shadow to perform an update since the shadow is the most likely to perform the next update.

The master keeps track of where each of the shadow replicas are located in the network. One technique for establishing which replica is the master and registering the shadows within the master is described in commonly assigned copending application, Ser. No. 07/961,750, entitled "Determining the Winner of a Race in a Distributed System" filed Oct. 16, 1992, now U.S. Pat. No. 5,469,575 and hereby incorporated by reference.

Figure 5:
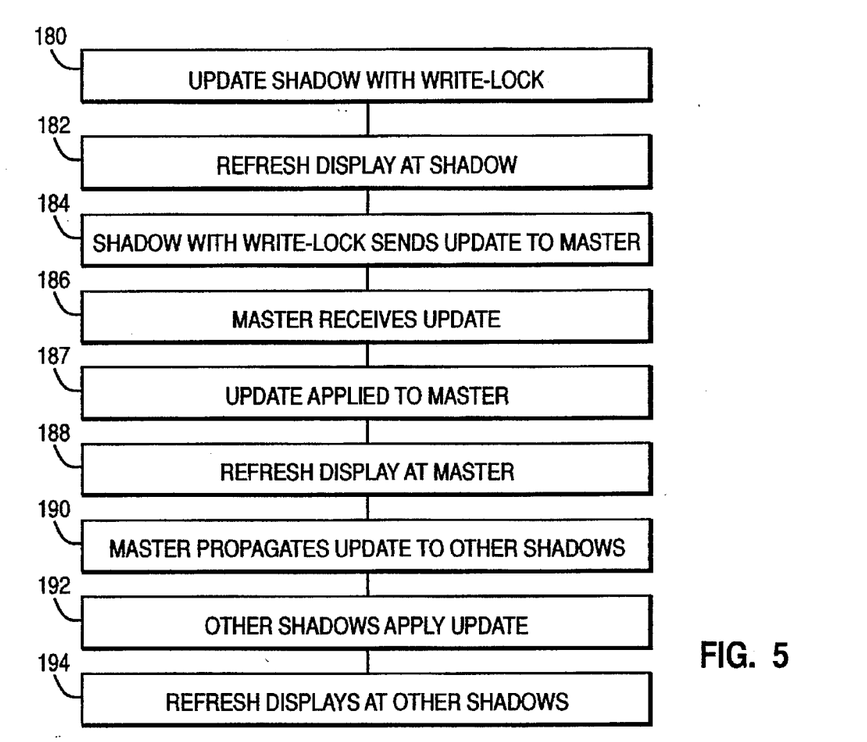
FIG. 5 is a flow diagram of an update procedure at the shadow replica with the write lock according to the present invention.

FIG. 5 depicts the update procedure at a shadow replica which holds the write lock according the present invention. The process begins in step 180 when the local shadow replica is updated. Next, the display is refreshed at the system with the local shadow replica, step 182 to reflect the update. In this case, the table view shown on display 110 on system 102 is refreshed (FIG. 3). Next, in step 184 the shadow which 120' performed the update sends the new update information to the master replica at the first system 100. The master receives the update in step 186 and applies the update to the master replica in step 187. The display, in this case a pie view of the data object, is refreshed at the system 100 which holds the master replica 120 (FIG. 3). The master replica propagates the update to any other, shadow replicas which exist, step 190. In the case of the present illustration, the master sends the update to the second shadow 120" on the third system 104 (FIG. 3). The second shadow replica applies the update, step 192 and refreshes its display of the bar chart 112 to reflect changes in the data object.

Figure 6A:
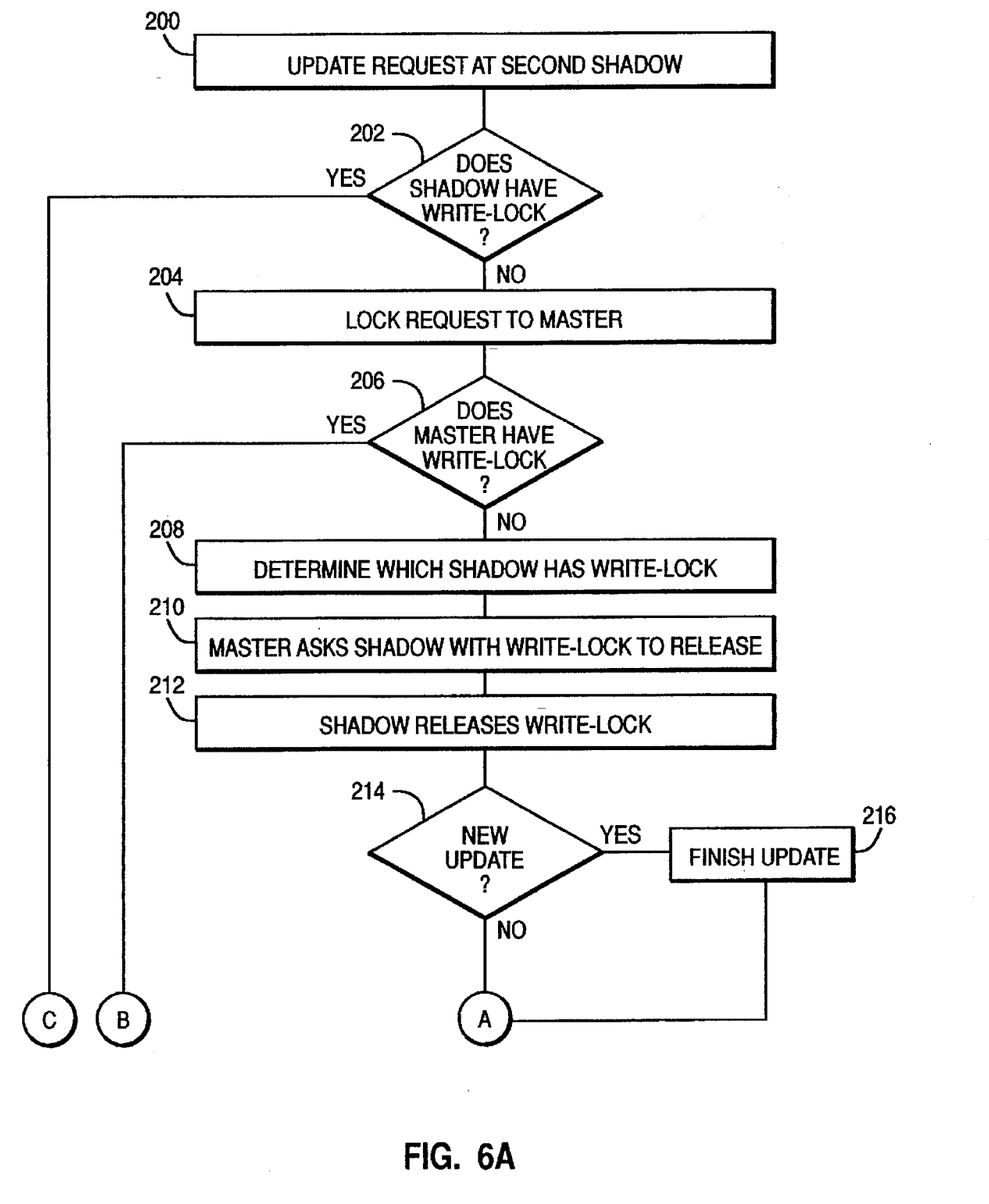
FIGS. 6A and 6B are flow diagrams for a request for the write lock originating at a second shadow replica when the first shadow replica holds the write lock.
Figure 6B:
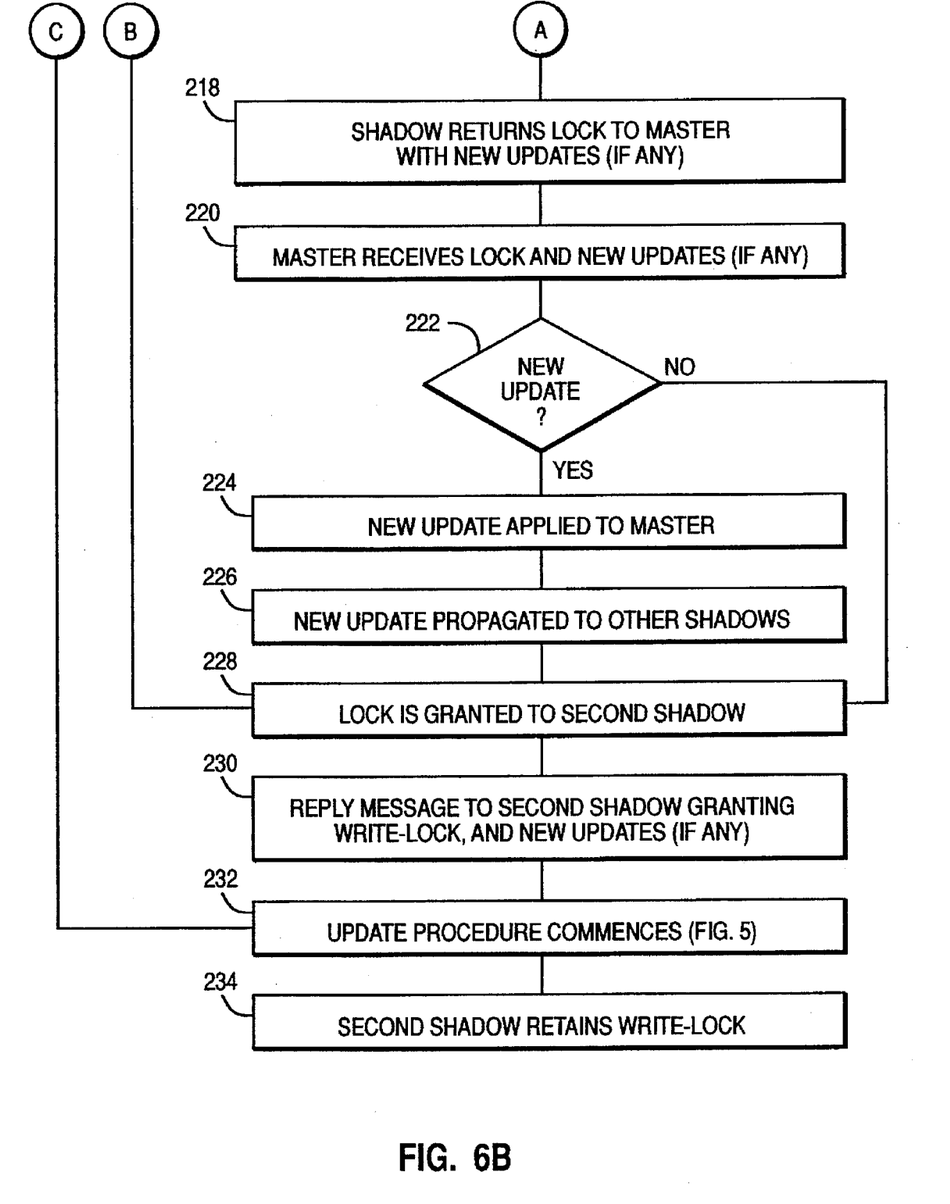

FIGS. 6a and 6b are flow diagrams for a request for the write lock which originates at a second shadow replica when another shadow replica holds the write lock. Process begins with a request to update a second shadow replica in step 200. A test is performed to determine whether the second shadow has the write lock, step 202. If not, a lock request is sent to the master, step 204. In step 206, the master determines whether it has the write lock. If not, it refers to the lock data structure depicted in FIG. 8, to determine which shadow has the write lock in step 208. The master asks the holding shadow replica to release the write lock to the master, step 210. The shadow will release the write lock in step 212, but performs a test, step 214, to determine whether it is in the middle of a new update to the data object. If so, it will finish the update to the local replica, step 216.

The process continues to FIG. 6b. The shadow replica returns the write lock to the master replica with any new updates, step 218. The master receives the lock and any new updates in step 220. A test is performed by the master, step 222, to determine whether there is a new update, if so the new update is applied to the master replica and the display associated with the master replica is refreshed in step 224. Next, the new update is propagated to the other shadows where they also apply the update and refresh their local displays, step 226. The lock is granted to the second shadow in step 228 by the master replica. The reply message which tells the second shadow replica that it has the write lock is sent in step 230. This reply also includes any updates needed to synchronize the second shadow with the master. Next, the update procedure commences which is depicted in FIG. 5, step 232. According to the preferred embodiment, the second shadow will retain the write lock in step 234 as it is most likely that the second shadow will perform the next update.

Figure 7:
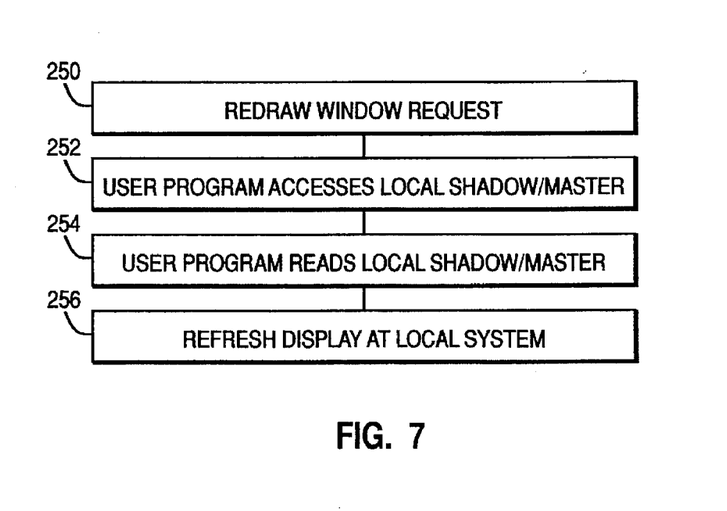
FIG. 7 is a flow diagram of a read operation on a local shadow replica in response to a redraw window request.

FIG. 7 depicts a full diagram of a read request from a user program to the local replica. The process begins with a request from the user program to redraw the windows because, for example, the user has decided to move the window which displays the view of the local replica copy, step 250. Since the present invention continuously updates all replicas, it is assumed that the local replica is current as to all updates. Therefore. the user program may access the local shadow or master replica in step 252, and be relatively assured of obtaining the most recent version of the data object. The user program reads the local shadow or master replica for the required information to refresh the screen display, step 254. The display is refreshed as the local system in step 256. As no change has occurred to the local replica no updates need to be propagated throughout the system.

Figure 8:
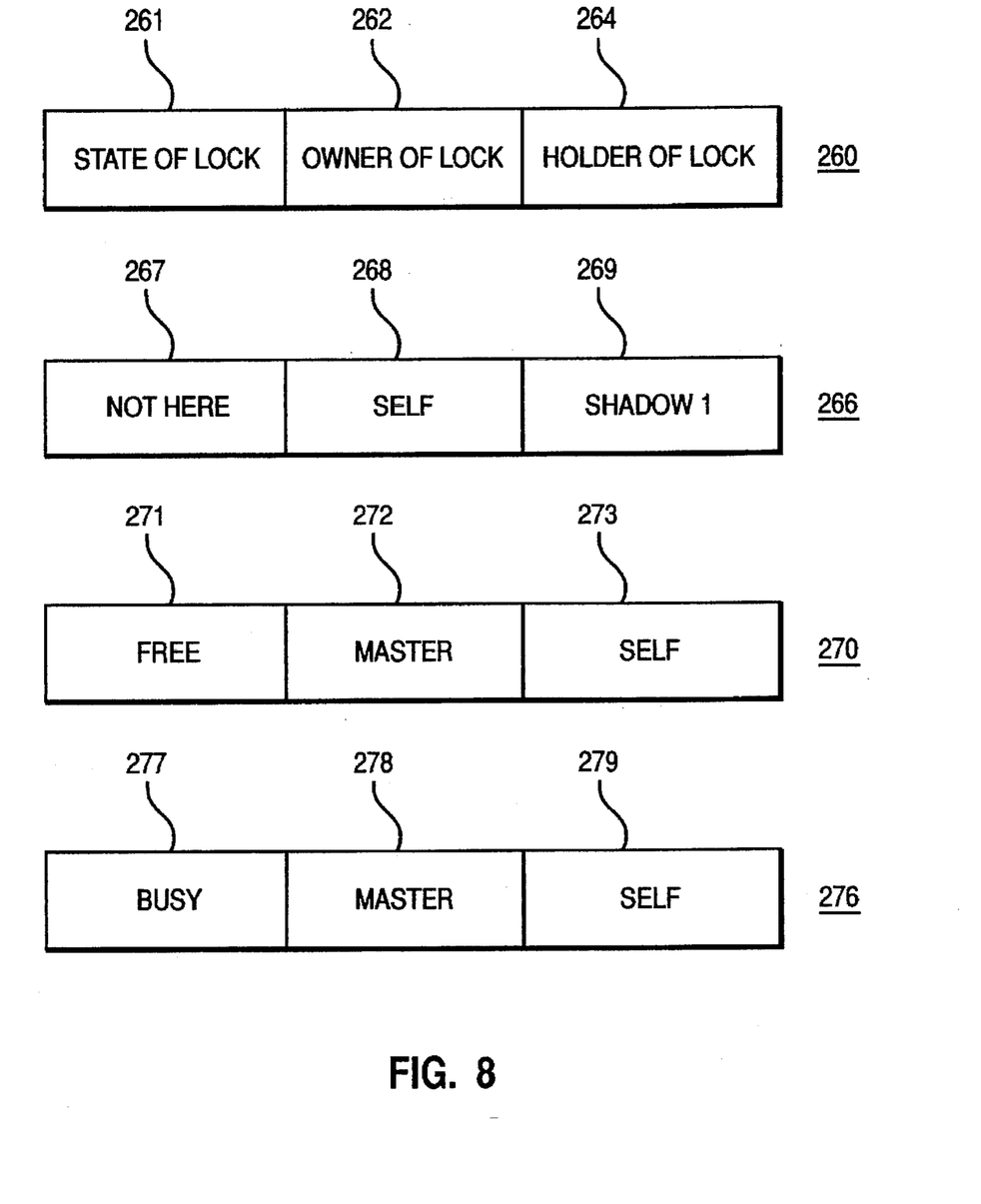
FIG. 8 shows a generalized write lock data structure and write lock data structures for master and shadow replicas.

FIG. 8 depicts a copy of a general write lock 260. Both the master and the shadows keep a lock data structure as shown in FIG. 8. The write lock comprises three fields, the first field 261 which contains the state of the write lock, a second field 262 contains the owner of the lock and the third field 263 which contains the current holder of the lock. The owner of the lock in the preferred embodiment will always be the master replica. However, the same replica may not always be the designated the master replica. Generally, the master replica will be the replica in the system which first comes up on the network. The holder of the lock may be any of the master or shadow replicas which are currently up and running on the network.

FIG. 8 also depicts three specific embodiments of the write lock data structure. The first embodiment depicts a master lock data structure 266, after the write lock is granted to shadow 1, the state of the lock 267 is "not here". The owner of the lock 268 is "self", and the holder of the lock 269 is "shadow 1" A second embodiment shows the shadow 1 lock data structure 270, after it obtains the lock. The state of the lock 271 is "free"; the owner of the lock 272 is the "master"; and the holder of the lock 273 is "self". The third embodiment shows shadow 1's lock data structure 276 while the local update is in progress. The state of the lock 277 is "busy", the owner 278 is again the "master" and the molder of the lock 279 is again "self".

Figure 9:
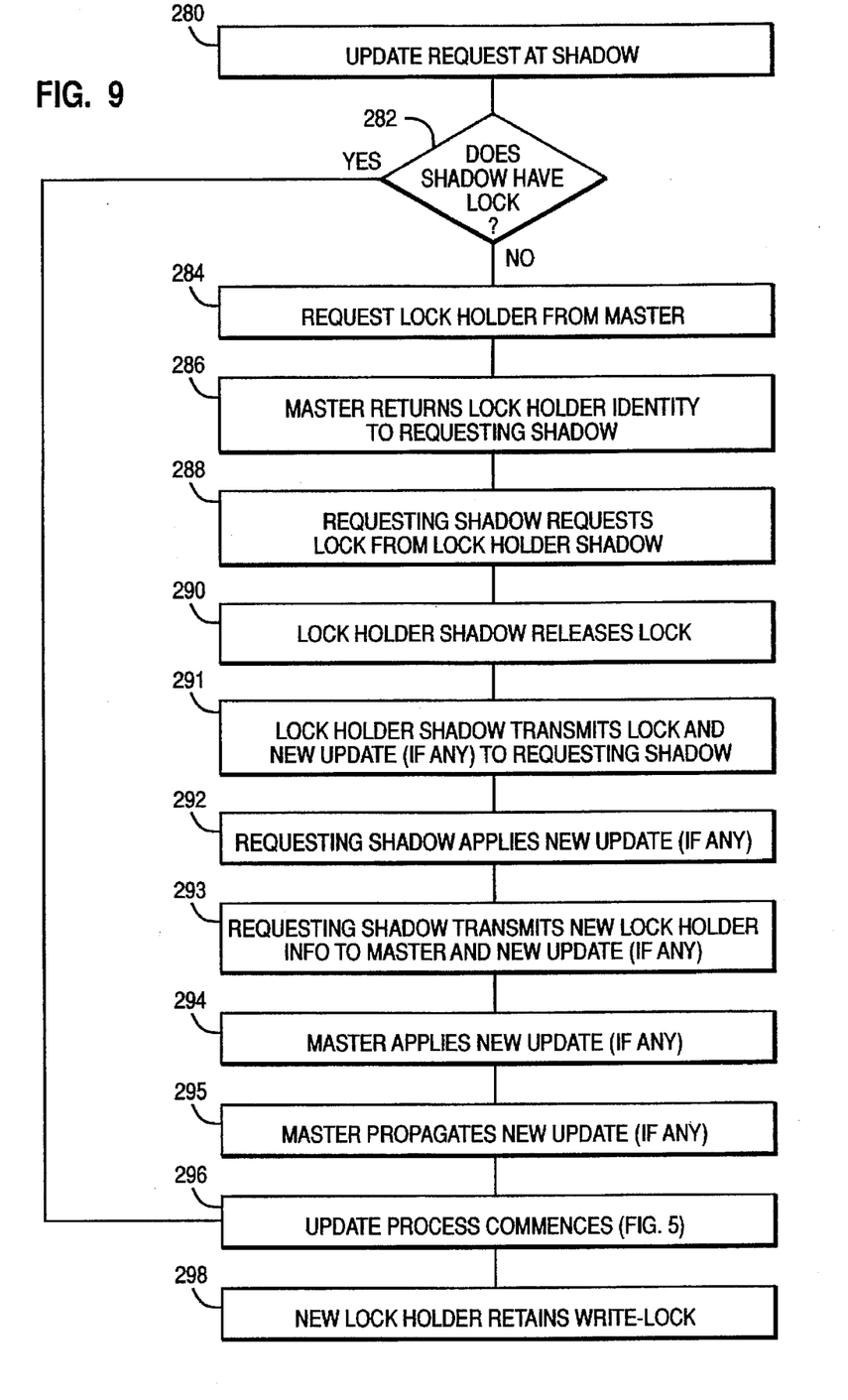
FIG. 9 is a flow diagram of a second embodiment of a request for a write lock.

FIG. 9 is a flow diagram of an alternative embodiment of a request for the write lock according to the present invention. In response to an update to the shadow replica, step 280, the local system determines whether its shadow replica has the write lock in step 282. If it determines that its shadow replica does not have the write lock, it requests the name of the lock holder replica from the master replica in step 284. The master replica returns a message which includes the identity of the lock holder replica to the requesting shadow replica, step 286. Next, the shadow replica requests the write lock from the replica which is currently holding the write lock in step 288. In step 290, the lock holding shadow replica releases the write lock. It transmits the write lock and any new updates, completing the update if necessary, to the requesting shadow replica, step 291. The requesting shadow replica applies the new update, if any, and refreshes the local display in step 292. Next, in step 293, the shadow transmits a message to the master informing it of the new lock holder replica and the new update, if any, as well. The master applies the new update in step 294 and propagates the new update in step 295. Next, the update process commences at the requesting shadow in step 296 as depicted in FIG. 5. The new lock holder retains the write lock as it is most likely to be the replica with the next update, step 298.

Figure 10:
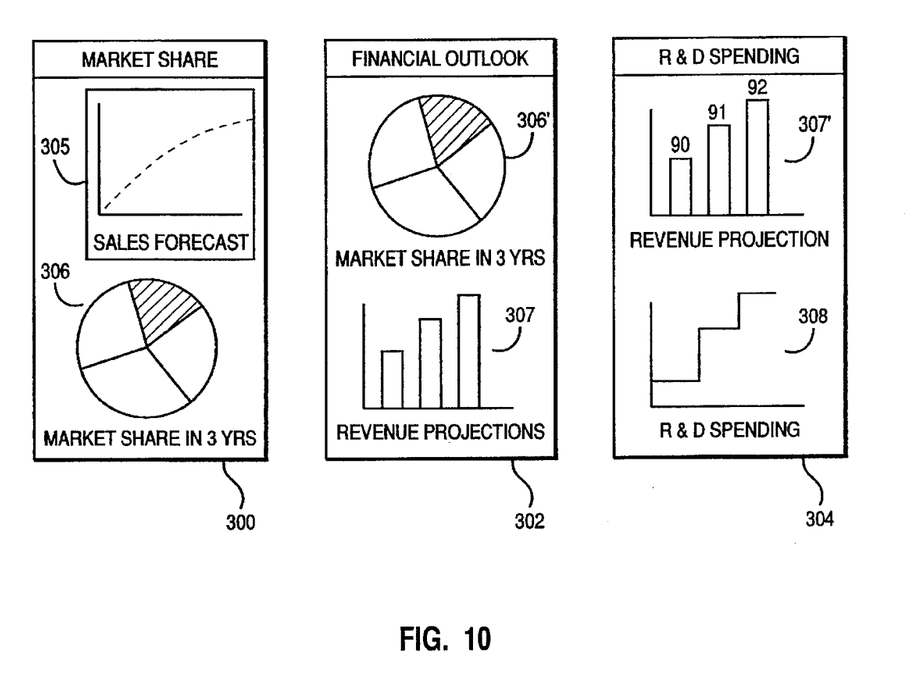
FIG. 10 depicts an embodiment in which multiple data objects update their data according to the present invention.

While the embodiment above has been described with respect to a single data object, it is quite possible to use the present invention where multiple data objects are updated according to the present invention. It is also quite possible that different systems within a distributed environment may hold master replicas of the different data objects. One situation is illustrated in FIG. 10. The displays of three different applications with some common objects are betrayed. A first window 300 corresponds to a market share application, a second window 302 corresponds to a financial outlook application and a third window 304 corresponds to an R&D spending application. Assuming that a market share window 300 came up first, the financial outlook window 302 came up second and the R&D spending window 304 came up last, several observations may be made. The market share window 300 contains both the sales forecast data object 305, and a market share data object 306, which it shares with the financial outlook window 302. Since the market share window 300 came up first, the market share data object, 306 is the master and the market share data object 306 prime is the shadow. Similarly, the revenue projects data object presented in 307 presented in the financial outlook window 302 is the master having come up before the revenue projection data object 307 in the R&D spending window 304. Thus, it is possible for different machines to hold master copies of the data objects. Alternatively, if the financial outlook window 302 had come up first, it would contain both master replicas.

While the invention has been described with respective to particular embodiments above, it will be understood by those skilled in the art that modifications may be made without departing from the skill and scope of the present invention. These embodiments are for purposes of example and illustration only and are not be taken to limit the scope of the invention narrower than the scope of the appended claims.

I claim:

1. A computer storage device for storing a set of instructions for executing a method in a computer system, the method for updating a plurality of replicas of a common data object each in a separate memory partition of the computer system, the method when executed comprising the steps of:

requesting a write lock from a first replica which currently holds the write lock;

moving the write lock to a second replica; performing an update to the second replica;

propagating the update to the plurality of replicas; and, refreshing a display of the system to reflect the update in at least one of the replicas.

2. The method as recited in claim 1 which further comprises the step of retaining the write lock at the second replica.

3. The method as recited in claim 1 in which the computer storage device can be coupled to a network in which a plurality of replicas are executable at a plurality of data processing systems coupled to the network and the first replica is in a memory partition in a first data processing system and the second replica is in a memory partition in a second data processing system.

4. The method as recited in claim 1 which further comprises:

requesting the write lock from a master replica;

determining whether the master replica holds the write lock;

requesting the write lock from a shadow replica which is holding the write lock; and, returning the write lock to the master replica.

5. The method as recited in claim 1 which further comprises the step of querying a master replica as to which of the plurality of replicas currently holds the write lock.

6. The method as recited in claim 5 which further contains the step of keeping track of the locations of the plurality of the replicas and which of the replicas is a current holder of the write lock.

7. A computer apparatus comprising:

a storage device for storing a program means for updating a plurality of replicas of a common data object distributed in a plurality of memory partitions, the program means comprising:

means for requesting a write lock from a first replica which currently holds the write lock;

means for moving the write lock to a second replica;

means for performing an update to the second replica;

means for propagating the update to the plurality of replicas; and, means for refreshing a display of the system to reflect the update in at least one of the replicas.

8. The apparatus as recited in claim 7 in which the program means further comprises means for retaining the write lock at the second replica.

9. The apparatus as recited in claim 7 in which the program means further comprises:

means for requesting the write lock from a master replica;

means for determining whether the master replica holds the write lock;

means for requesting the write lock from a shadow replica which is holding the write lock; and, means for returning the write lock to the master replica.

10. The apparatus as recited in claim 7 in which the program means further comprises means for querying a master replica as to which of the plurality of replicas currently holds the write lock.

11. The apparatus as recited in claim 7 which the program means further comprises means for keeping track of the locations of the plurality of the replicas and which of the replicas is a current holder of the write lock.

* * * * *